Feb. 2, 1965
O. WAGNER ETAL
3,167,970
MANUAL AND AUTOMATIC TRANSMISSION
Filed April 23, 1962
6 Sheets-Sheet 1
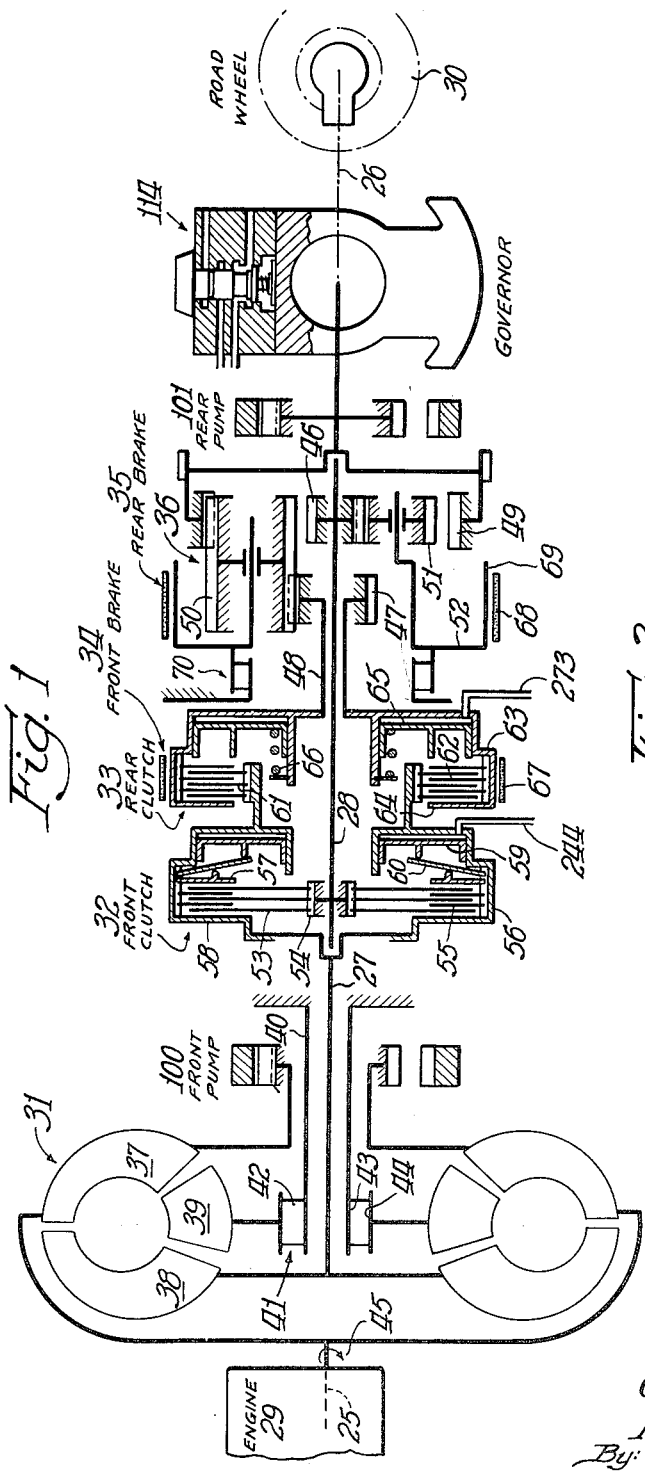
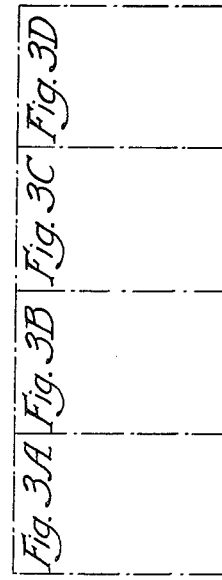
Inventors:
Oskar Wagner and
Richard E. Young
By: Robert L. Zieg Atty

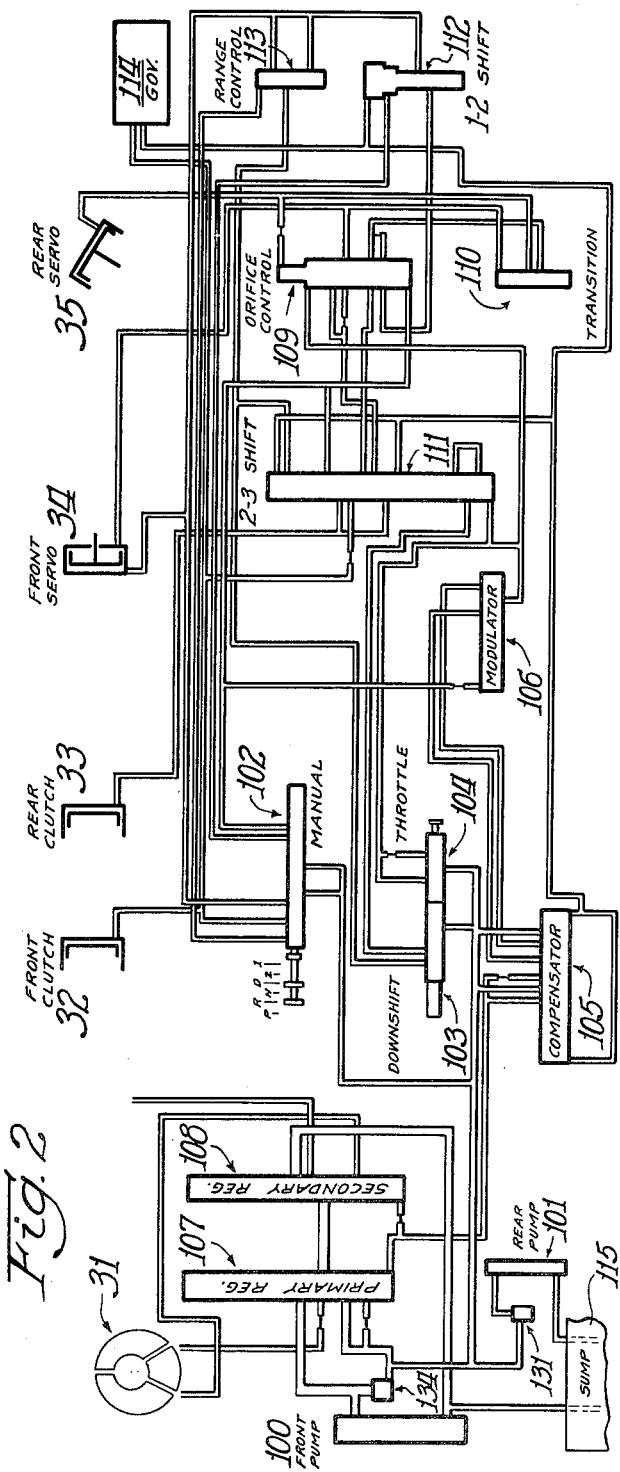

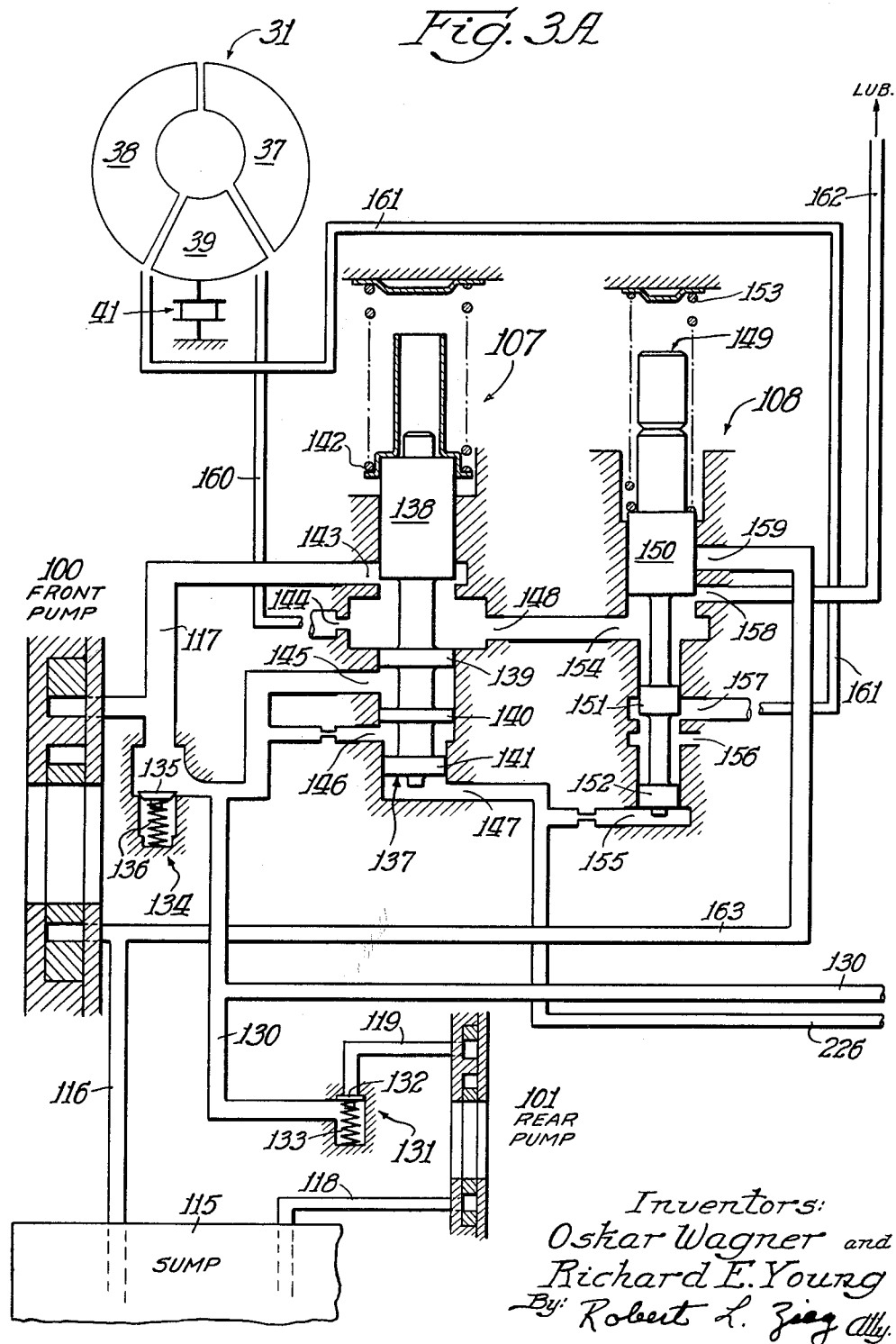

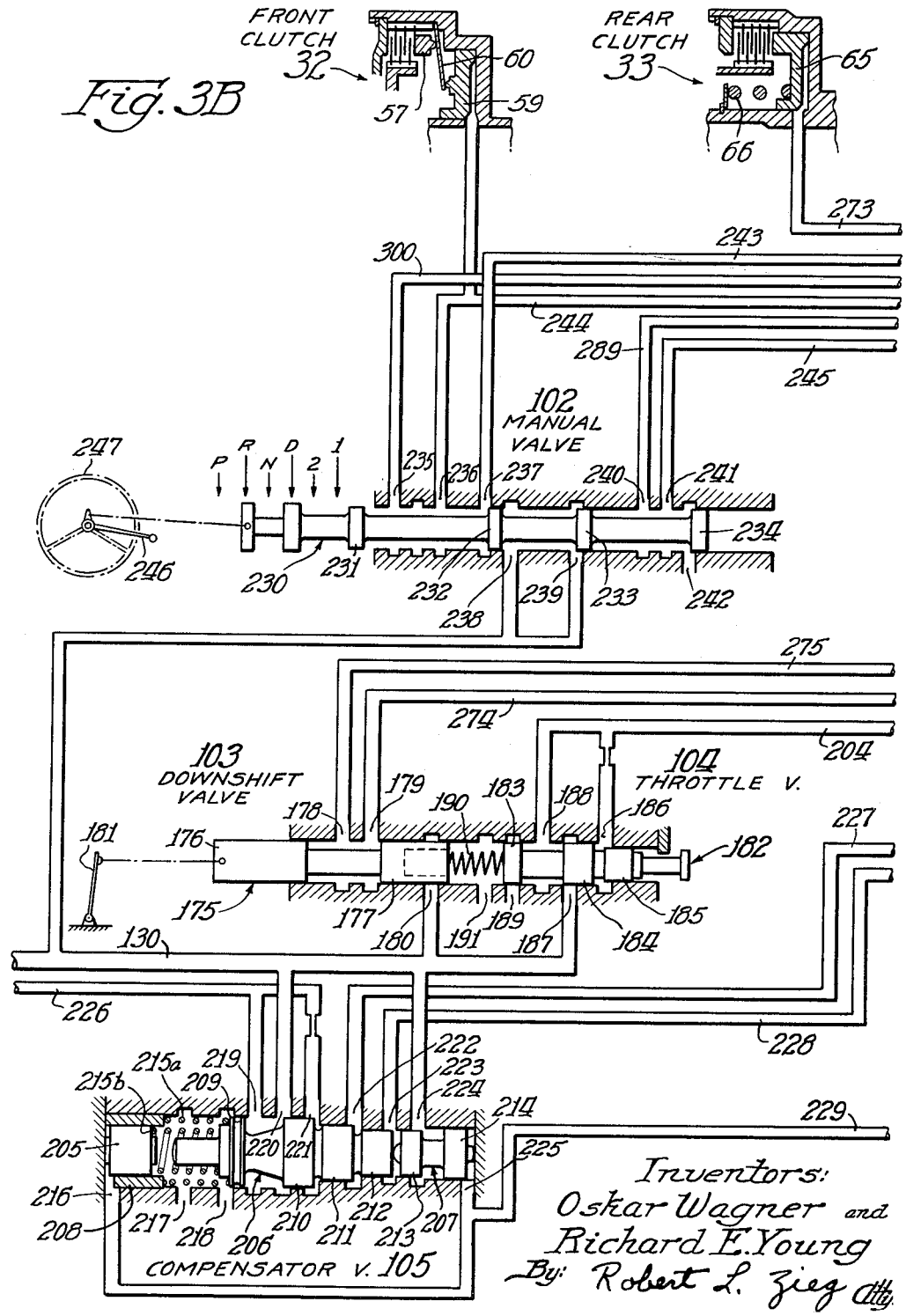

Feb. 2, 1965  O. WAGNER ETAL  3,167,970
MANUAL AND AUTOMATIC TRANSMISSION
Filed April 23, 1962  6 Sheets-Sheet 5
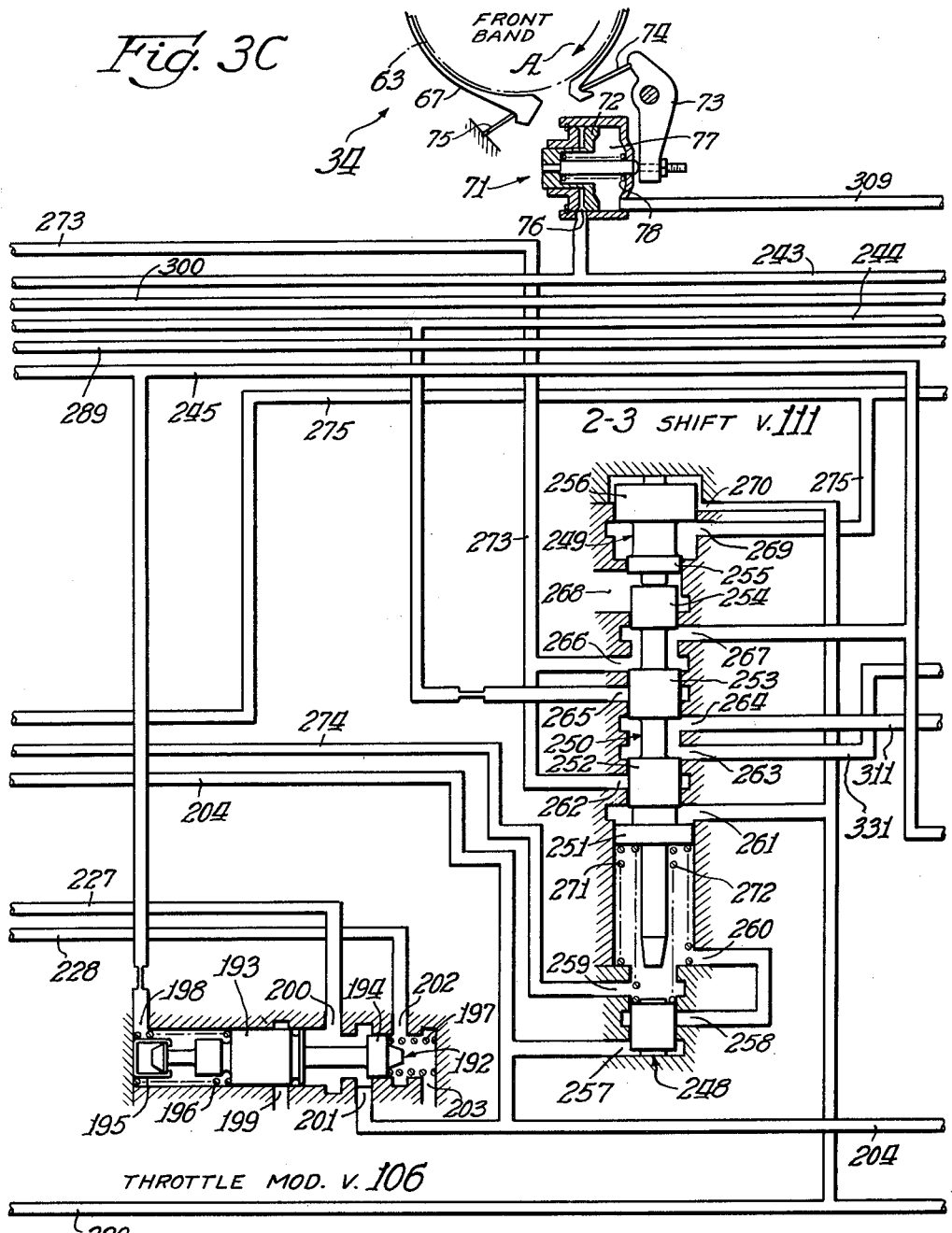
Inventors:
Oskar Wagner and
Richard E. Young
By: Robert L. Zieg Atty.

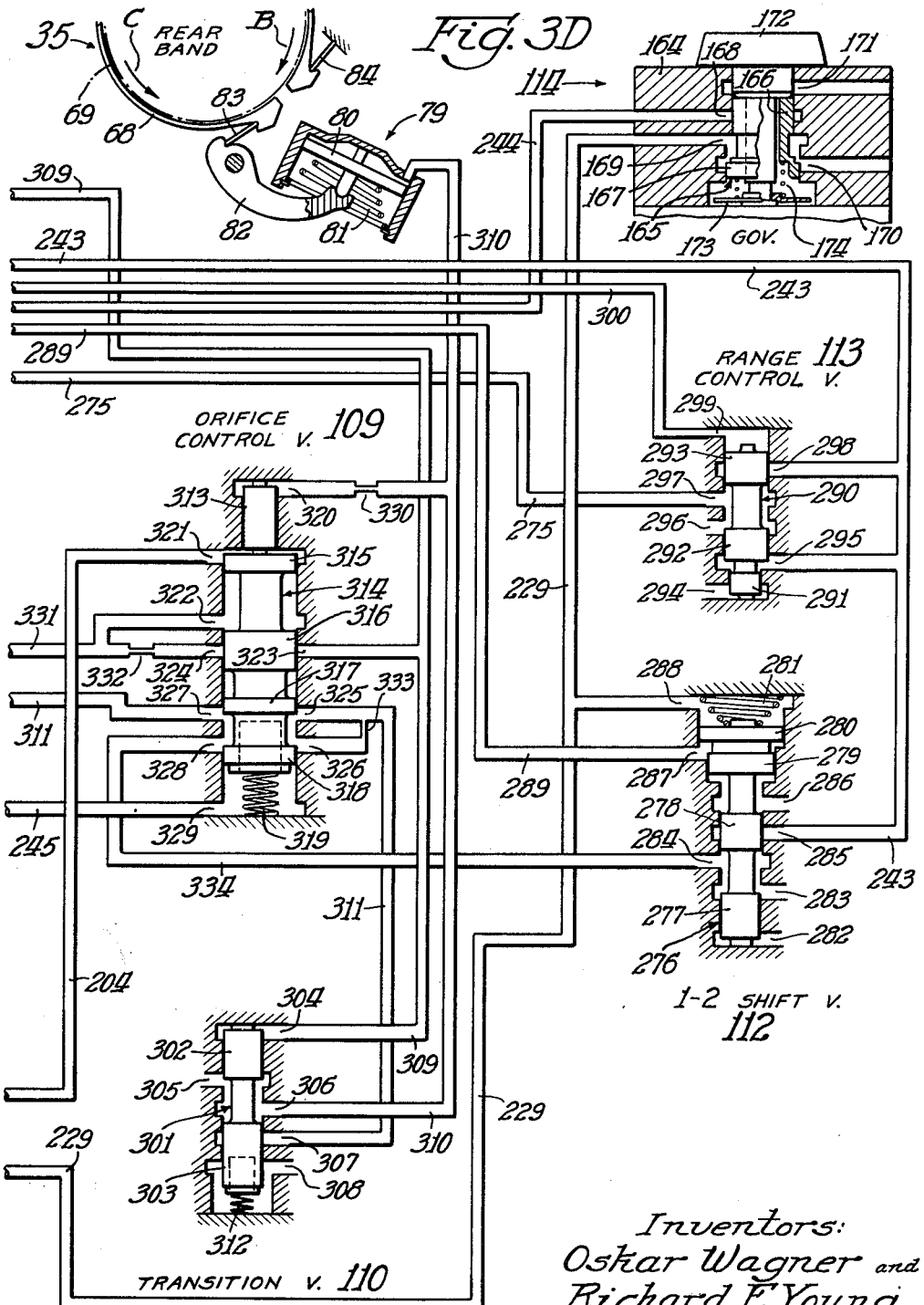

United States Patent Office 3,167,970
Patented Feb. 2, 1965

3,167,970
MANUAL AND AUTOMATIC TRANSMISSION
Oskar Wagner and Richard E. Young, Muncie, Ind., assignors to Borg-Warner Corporation, Chicago, Ill., a corporation of Illinois
Filed Apr. 23, 1962, Ser. No. 189,587
6 Claims. (Cl. 74—472)

This invention relates to an automatic transmission for use in an automotive vehicle and the control system therefor.

One of the objections to the known type of automatic transmission is that due to the very nature of providing automatic shifting between gear ratios, the operator loses almost all control over what ratio the transmission is operating in when the transmission is operating in the forward ratios. The shift patterns must be designed so as to fit the general conditions of operation of the automobile and therefore certain circumstances may occur in driving an automobile wherein the operator may desire the transmission to be in a drive ratio other than that which the transmission provides through its normal automatic operation.

Accordingly, it is an object of the present invention to provide an automatic transmission wherein the transmission may be used as an automatic transmission to provide automatic ratio changes or alternatively as a transmission wherein the operator may select the desired ratio of operation.

More particularly, it is an object of this invention to provide an automatic transmission having low, intermediate, and high forward drive ratios wherein by use of the selector lever either the low or intermediate drive ratios may be manually selected by moving the selector lever into a "1" or "2" position respectively. The control system further provides a "D" or automatic range wherein the transmission will function to provide automatic shifting between the intermediate and high forward drive ratios.

In the control mechanism of the present invention, means are provided to lock the shift valves of the hydraulic controls in the proper position to provide either the low or intermediate drive ratio as selected by the operator. In the control system provided, fluid pressure is used to lock the shift valves in the proper position when a manual selection of ratio is made.

It is also an object of the present invention to provide means to inhibit downshifts when the selector is moved from the "D" or automatic range to the "2" position or from the "2" position to the "1" position. The downshifts are inhibited by means controlling the shift valves so that the downshift will not occur until the vehicle speed relative to engine speed is at the proper value to prevent overspeeding of the engine when shifting to a lower speed ratio.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIGURE 1 is a longitudinal sectional view of a transmission mechanism with which the controls of the present invention are intended to be used;

FIGURE 2 is a schematic diagram of the complete control system for the transmission mechanism;

FIGURE 3 is a reference layout diagram for combining FIGURES 3A, 3B, 3C, and 3D; and FIGURES 3A-3D present a more detailed description of the control system of FIGURE 2.

Like characters of reference designate like parts in the several views.

The transmission with which my improved hydraulic controls are adapted to cooperate may be seen in FIGURE 1 to comprise a drive shaft 25, a driven shaft 26, and intermediate shafts 27 and 28. The shaft 25 may be the usual crank shaft of the engine 29 of the vehicle, and the shaft 26 may be connected with the usual driving road wheels 30 of the vehicle by any suitable well-known power transmitting mechanism. The shafts 27 and 28 are in effect piloted with respect to the shafts 25 and 26. The transmission comprises in general a hydraulic torque converter 31, hydraulically operated friction clutches 32 and 33, hydraulically operated friction brakes 34 and 35, and a planetary gear set 36.

The hydraulic torque converter 31 comprises a vaned impeller element 37, a vaned rotor or driven element 38, and a vaned stator or reaction element 39. The impeller 37 is driven from the drive shaft 25, and the rotor 38 is fixed to the intermediate shaft 27. The stator 39 is rotatably disposed on a stationary sleeve 40, and a one-way brake 41 is disposed between the stator and the sleeve 40. The one-way brake 41 may be of any suitable construction, and, in the illustrated embodiment, comprises a plurality of tiltable sprags 42 disposed between an inner race surface 43 fixed with respect to the sleeve 40 and an outer race surface 44 fixed with respect to the stator 39. The one-way brake 41 is so arranged as to allow free rotation of the stator 39 in the forward direction, that is, in the same direction in which the drive shaft rotates and which is indicated by the arrow 45 and prevents a rotation of the stator in the reverse direction.

The torque converter 31 functions in a manner well-known for such torque converters for driving the rotor or driven element 38 at an increased torque with respect to the torque impressed on the impeller 37 of the converter. The vanes of the stator 39 function to change the direction of flow of fluid between the rotor and impeller so as to provide this increased torque on the driven element 38. In this case, the reaction on the stator 39 is in the direction reverse to the direction of rotation of the drive shaft 25, so that the one-way brake 41 engages and prevents rotation of the stator in this direction. When the speed of the rotor 38 reaches a predetermined value, the reaction of the stator vanes 39 changes in direction, tending to rotate the stator in the forward direction; and the brake 41 releases and allows such rotation of the stator. In this case, the torque converter 31 functions as a simple fluid coupling which drives the rotor 38 at substantially the same speed and with no increase in torque with respect to the impeller 37.

The planetary gear set 36 comprises a sun gear 46 which is fixed on the shaft 28, a second sun gear 47 fixed on a sleeve portion 48 which is rotatable on the shaft 28, a ring gear 49 fixed with respect to the driven shaft 26, a plurality of planet gears 50, a plurality of planet gears 51 and a planet gear carrier 52. Each planet gear 50 and each of the planet gears 51 is rotatably disposed on and is carried by the carrier 52. The carrier 52 is rotatably disposed with respect to the shaft 28 and the shaft portion 48 by any suitable bearings. The planet gears 51 are each in mesh with the sun gear 46 and also with a planet gear 50. The gears 50 are also in mesh with the ring gear 49 and with the sun gear 47.

The clutch 32 is arranged to connect the shaft 27 driven by the rotor 38 with the shaft 28 and the sun gear 46 fixed thereon. The clutch 32 comprises clutch discs 53 splined on a hub member 54 which is fixed on the shaft 28. The clutch also comprises clutch discs 55 interleaved between the discs 53 and fixed within a member 56, that is, in turn fixed to the shaft 27 so as to be driven by this shaft.

The clutch 32 comprises a movable pressure plate 57 splined within the member 56 and adapted to press the friction discs 53 and 55 together in frictional engagement between it and an enlarged annular part 58 of the shaft 27. An annular piston 59 is provided for actuating the movable pressure plate 57. The pressure from the piston 59 is transmitted to the pressure plate 57 through a spring strut 60 which is in the form of an annular Belleville washer. The strut 60 at its inner periphery moves axially with respect to its outer periphery and moves the pressure plate 57 which is acted on by the strut 60 at intermediate points thereof. The inherent resilient action of the strut 60 functions to return the piston 59 back into its illustrated position when fluid pressure, applied as will be hereinafter described, is released from the piston.

The clutch 33 is arranged to connect the part 56 and thereby the shaft 27 with the shaft portion 48 and the sun gear 47 and comprises clutch discs 61 splined onto the member 56 and clutch discs 62 splined within a member 63 which is fixed to the shaft portion 48. A pressure plate portion 64 is fixed to the member 63 on one side of the clutch discs, and an annular hydraulic piston 65 is provided on the other side of the discs for compressing the discs between it and the pressure plate portion 64. A return spring 66 is provided for acting on the piston 65 and yieldably holding it in its clutch disapplying position.

The brake 34 comprises a brake band 67 adapted to be contracted on the part 63 for thereby braking the sun gear 47. The brake 35 comprises a brake band 68 adapted to be contracted on a drum portion 69 of the planet gear carrier 52. A one-way brake 70 is provided for the planet gear carrier 52.

The manual valve 102 of the transmission shown in FIGURE 3B, has the following positions: P, R, N, D 2, 1. In operation, by moving the manual valve to the desired position, the transmission has a neutral condition and provides a low speed ratio in the "1" position, an intermediate speed radio in the "2" position, intermediate and high speed ratios in the "D" position, and a reverse drive ratio in the "R" position. When the manual valve is moved to the "P" position by the selector lever 246, a pawl (not shown) engages external teeth on the ring gear 49 to lock the driven shaft 26 against rotation as is well known in the art.

Low speed forward drive is obtained only in the "1" position of the manual valve 102 and at no other time. The transmission will remain in the low speed ratio until the operator moves the manual valve 102 out of the "1" position. This ratio is obtained by engaging clutch 32, by applying fluid pressure to the piston 59, and brake 35 by applying fluid to piston 80. The low speed power train exists from the drive shaft 25 through the torque converter 31, the intermediate shaft 27, the clutch 32, the shaft 28, and the planetary gear set 36 to the shaft 26. For this drive the brake 35 holds the planet carrier 52 stationary so that the carrier 52 constitutes the reaction element of the gear set 36. The one-way brake 70 is also used at times to hold the carrier 52 stationary as will be later described. The shaft 28, driven as just described, drives the sun gear 46 which constitutes the driving element of the gear set 36. The drive is transmitted through the planet gears 50 and 51 from the sun gear 46 to the ring gear 49, thus driving the shaft 26 at a reduced speed with respect to the shaft 28. Torque conversion takes place in both the hydraulic torque converter 31 and also in the gear set 36, so that the torque with which the shaft 26 is driven is the product of the individual torque multiplications of the hydraulic torque converter 31 and the gear set 36. It will be understood, as above described, however, that the torque conversion produced by the hydraulic torque converter 31 decreases as the speed of the driven element 38 increases, and eventually the torque converter 31 functions as a simple fluid coupling producing no torque conversion within it.

As above-described, the low speed ratio is a two-way drive and provides engine braking when coasting. The one-way brake is used during the shift from low speed drive to intermediate ratio when the manual valve is moved from the "1" position to the "2" position. If a delay occurs during this shift and the brake 35 releases before brake 34 is engaged, the engine would be able to speed up and a jerk would occur when brake 34 was engaged. To prevent this, the one-way brake 70 takes over from the brake 35 when the brake 35 is released and prevents the engine speeding up until the brake 34 is engaged, since the one-way brake acts to prevent rotation of the carrier 52 in the same direction as the brake 35 for the low speed ratio. When the brake 34 engages, the carrier 52 then begins to rotate in the forward direction and one-way brake 70 automatically disengages at the proper time to provide a smooth shift from low to intermediate ratio.

The intermediate speed power train is completed by allowing the clutch 32 to remain engaged, releasing brake 35, and engaging brake 34. The flow of power for the intermediate speed power train is the same as for the low speed power train; however, for the intermediate speed power train, the sun gear 47 is the reaction element of the gear set 36 rather than the carrier 52, the gear 47 for the intermediate speed drive being held stationary by the brake 34. Since there are two sets of planet gears 50 and 51 between the sun gear 46 and the ring gear 49 and since the sun gear 47 is in mesh with the gears 50, the ring gear 49, and thereby the shaft 26 are driven at a reduced speed with respect to the shaft 28 which is, however, higher than for the low speed drive. The intermediate ratio will be established when the manual valve 102 is moved to the "2" position or the "D" position. When the manual valve is in the "2" position the transmission will remain in the intermediate ratio until the operator move the valve out of this position.

The high speed power train will be established when the manual valve 102 is in the "D" position and conditions are such that the transmission shifts from the intermediate ratio to the high speed ratio. The high speed power train is obtained by allowing the clutch 32 to remain engaged and engaging the clutch 33 in lieu of the brake 34. The clutch 33 may be engaged by applying fluid pressure to its piston 65. In this drive, the shaft 27 is driven through the torque converter 31 from the drive shaft 25 as in intermediate speed drive. The shaft 27 is connected through the clutch 32 to drive the sun gear 46 as was the case in intermediate speed drive. The clutch 33 functions to connect part 56, which is connected to the shaft 27, with the part 63 and thereby with the sun gear 47. Thus, both the sun gear 46 and also the sun gear 47 are driven by the shaft 27, and as is well-known in connection with planetary gear sets, when two elements of the gear set are driven at the same speed, the gear set becomes locked up so that all of its gears and elements rotate as a unit. There is thus a direct drive between the shafts 27 and 26. The converter 31 may be expected to function as a simple fluid coupling, generally, in this drive; and there thus exists a substantially direct drive between the drive shaft 25 of the transmission and its driven shaft 26.

Reverse drive may be obtained through the transmission by engaging the brake 35 and the clutch 33. The power train for this drive is from the drive shaft 25 through the torque converter 31, the intermediate shaft 27, the clutch 33, the sun gear 47, the planet gear 50, and the ring gear 49 to the driven shaft 26. The brake 35 causes the planet gear carrier 52 to function as the reaction element of the gear set; and in this case, the reaction on the carrier 52 is in the forward direction. Since there are only the single planet gears 50 between the sun gear 47 which drives and the ring gear 49 which is driven, the ring gear 49 and the shaft 26 will be driven at a reduced speed in the reverse direction with respect to the shaft 27. For this drive, the torque converter 31 generally functions to increase torque; and thus the torque impressed on the shaft 26 is the product of the torque increases by the torque converter 31 and the planetary gear set 36.

The neutral condition of the transmission is established when clutches 32 and 33 and brakes 34 and 35 are disengaged.

The brake 34 is applied by means of a hydraulic motor 71. The motor 71 comprises a piston 72 connected by means of a bell crank 73 and a strut 74 with one end of the brake band 67, the other end of the brake band 67 being held fixed by means of a strut 75. The motor 71 has a brake applying fluid pressure cavity 76 and a brake disapplying fluid pressure cavity 77, and a spring 78 acts on the piston 72 tending to hold it in its brake disapplying position. Fluid pressure supplied to the cavity 76 moves the piston 72 against the spring 78 so as to move one end of the brake band 67 to engage it with the drum 63. It may be noted at this point that the direction of reaction on the sun gear 47 and the drum 63 is in the reverse direction as indicated by the arrow A when the brake 34 is engaged for the intermediate speed ratio power train. This direction is opposite the direction of rotation of the drive shaft 25 indicated by the arrow 45; and the drum 63, intending to rotate in this direction, augments the action of the strut 74 in engaging the band 67 and causes increased band engagement, since the drum 63 tends to carry the end of the band acted on by the strut 74 in the same direction in which this end of the band is urged by the strut 74. It is apparent that the band 67 wraps or is partially self-energizing for this rotative tendency of the drum 63.

The brake 35 is engaged by means of a fluid pressure motor 79 which comprises a piston 80 movable by fluid pressure applied thereto against the action of a spring 81. Motion of the piston 80 is transmitted to one end of the brake band 68 by means of a bell crank 82 and a strut 83, the other end of the brake band 68 being held fixed by means of a strut 84. In low speed drive through the transmission, the reaction on the planet gear carrier 52 and on the drum 69 is in the reverse direction as indicated by the arrow B, and this reaction or tendency to rotate would tend to unwrap the band 68 with respect to the drum 69; however, the one-way brake 70 is so arranged as to hold the carrier 52 from such rotation in the reverse direction, and the holding ability of the brake 35 is not required, under these conditions. The reaction on the brake drum 69 for reverse drive is in the forward direction as indicated by the arrow C, that is, in the same direction as the drive shaft 25 rotates. The tendency of the drum 69 to rotate in this direction assists the strut 83 in forcing the movable end of the band 68 to move in the direction indicated by the arrow C, and the brake 35 thus wraps or is self-energizing for this direction of reaction, so that the braking effect is greater than would be the case if there were no tendency for the drum to rotate. The reaction on the drum 69 is greater for reverse drive than for low forward drive, and hence, the brake 35 has been constructed to wrap for the reaction for reverse drive instead of that for low speed forward drive.

It is believed that the construction of the transmission will be apparent from the diagrammatic illustration in FIGURE 1 and that a person skilled in the art can supply the various detailed parts, such as bearings, to build an actual device; however, for an actual illustration of such detailed parts, the copending application of Robert W. Wayman, Serial No. 166,136, filed June 5, 1950, which discloses a similar transmission, except for the one-way brake 70, may be referred to.

The hydraulic control system for the transmission comprises, in general a front pump 100, a rear pump 101, a manual valve 102, a downshift valve 103, a throttle valve 104, a compensator valve 105, a throttle modulator valve 106, a main oil pressure regulator valve 107, a low oil pressure regulator valve 108, an orifice control valve 109, a transition valve 110, a 2–3 shift valve 111, a 1–2 shift valve 112, a range control valve 113, and a governor valve 114.

The pumps 100 and 101 may be of any suitable fixed displacement type and may be of the internal-external gear type. Pump 100 draws fluid from the sump 115 through an inlet conduit 116 and discharges it into an outlet conduit 117. Pump 100 is driven directly from drive shaft 27 through the impeller 37. Pump 101 draws fluid from sump 115 through an inlet conduit 118 and discharges it into an outlet conduit 119. Pump 101 is driven from the driven shaft 26 of the transmission.

A conduit 130 constitutes the supply or line pressure conduit for engaging the power train completing friction clutches and brakes. A check valve 131 is disposed between the conduits 119 and 130 and comprises a piston 132 yieldingly held in its closed position by means of a spring 133. The check valve 131 blocks fluid flow from the conduit 130 to the conduit 119 and the rear pump 101.

A similar check valve 134 comprising a piston 135 and a spring 136 is provided between the line pressure conduit 130 and the outlet conduit 117 for the front pump 100.

The main pressure regulator valve 107 shown in FIGURE 3A functions to regulate pressure in the line pressure conduit 130. The valve 107 comprises a piston 137 having lands 138, 139, 140, and 141. A spring 142 is provided for moving the piston 137 downwardly as seen in FIGURE 2A. The valve 107 has ports 143, 144, 145, 146, 147, and 148. The ports 145 and 146 are connected to line pressure conduit 130, and port 143 is connected with outlet conduit 117 of pump 100. Ports 144 and 148 are permanently connected around the piston 137.

The valve 108 shown in FIGURE 3A is a regulating valve for regulating the pressure within the hydraulic torque converter 31. The valve 108 comprises a valve piston 149 having lands 150, 151, and 152. A spring 153 is provided between lands 150 and a stationary part for yieldably holding the piston 149 downwardly. The valve 108 comprises ports 154, 155, 156, 157, 158, and 159. The port 154 is connected with ports 144 and 148 which are permanently connected around the valve piston 137 and also with the torque converter 31 through a torque converter inlet conduit 160; the port 155 is connected with the port 147 of the valve 107; the port 156 is a bleed port adapted to discharge into sump 115; the port 157 is connected by means of a torque converter outlet conduit 161 with the torque converter 31; the port 158 is connected with a conduit 162 which supplied lubricating oil to any suitable parts of the transmission; and the port 159 is connected by means of a conduit 163 with the pump inlet conduit 116.

The governor valve 114 shown in FIGURE 3D provides a speed responsive fluid pressure to cause various ratio changes in the transmission. The governor valve 114 comprises a casing 164 which is fixed on driven shaft 26 and a piston 165 slidably disposed within a cavity in the casing 164. The piston 165 has lands 166 and 167. The governor valve 114 is provided with ports 168, 169, 170, and 171. The ports 170 and 171 are bleed ports discharging into sump 115. A governor weight 172 extends through and is slidably disposed within governor piston 165. The weight 172 has a spring retainer washer 173 fixed on its inner end, and a spring 174 extends between the washer 173 and an internal shoulder formed within the piston 165 for yieldably holding the weight 172 and the valve piston 165 together in the relative positions shown.

The throttle valve 104, the compensator valve 105, and the throttle modulator valve 106 produce pressures which vary with the position of the accelerator of the vehicle for varying the shift points of the transmission and also for varying the pressures applied to the various clutches and brakes of the transmission. The throttle valve 104 is under the control of the downshift valve 103. The downshift valve 103, shown in FIGURE 3B, comprises a valve piston 175 having lands 176 and 177. The downshift valve 103 has ports 178, 179, and 180. The port 180 is in connection with the line pressure supply conduit 130. The valve piston 175 is under the control of the vehicle accelerator 181 by any suitable connecting mechanism, so that when the accelerator 181 is moved toward an open throttle position, it moves the piston 175 to the right as seen in FIGURE 2B. It will be understood that the accelerator 181 has the standard connections with the carburetor of the vehicle engine 29.

The throttle valve 104, shown in FIGURE 3B, comprises a piston 182 and lands 183, 184, and 185. The valve 104 has ports 186, 187, 188, and 189. A spring 190 is provided between the two valves 103 and 104.

The throttle modulator valve 106, shown in FIGURE 3C, comprises a piston 192 having lands 193 and 194. A sheet metal spring retainer 195 embraces an end of the piston 192 and a spring 196 is provided between the land 193 and the retainer 195. A spring 197 is provided between the land 194 and the adjacent end of the cavity in which the piston 192 is disposed. The valve 106 has ports 198, 199, 200, 201, 202, and 203. The ports 199 and 203 are bleed ports, and the port 201 is connected with a throttle pressure supply conduit 204 to which the ports 186 and 188 of the throttle valve 104 are also connected.

The compensator valve 105, shown in FIGURE 3B, comprises pistons 205, 206, and 207. The piston 205 comprises a simple plug slidably disposed in a stationary sleeve 208. The piston 206 comprises lands 209, 210, 211, and 212. The piston 207 comprises lands 213 and 214. A spring 215a is disposed between the land 209 and the stationary sleeve 208. A spring 215b is disposed between piston 205 and land 209.

The compensator valve has ports 216, 217, 218, 219, 220, 221, 222, 223, 224, and 225. The port 221, which is relatively restricted, and the port 219 and connected by means of a compensator pressure supply conduit 226 with the ports 147 and 155 of the pressure regulator valves 107 and 108; port 222 is connected by means of a conduit 227 with port 200 of the valve 106; port 223 is connected by means of a conduit 228 with port 202 of valve 106; ports 216 and 225 are connected with a governor pressure supply conduit 229 that is also connected with port 169 of the governor valve 114; the ports 220 and 224 are connected with the line pressure supply conduit 130; and the ports 217 and 218 are bleed ports.

The manual valve 102 controls the various ranges of operation of the transmission. The valve 102 comprises a valve piston 230 having lands 231, 232, and 233, and 234. The valve 102 is provided with ports 235, 236, 237, 238, 239, 240, 241, and 242. The ports 238 and 239 are connected with line pressure supply conduit 130, port 237 is connected by conduit 243 with cavity 76 on one side of piston 72, port 236 is connected by means of conduit 244 with port 168 of governor valve 114 and the clutch piston 59 of front clutch 32, port 241 is connected by means of conduit 245 with port 198 of throttle modulator valve 106, and port 242 is an exhaust port. The manual valve piston 230 is controlled from the driver's compartment by means of a selector lever 246 located directly beneath steering wheel 247, the selector lever being connected by any suitable connecting mechanism to piston 230 so piston 230 can be moved to any of its principal positions.

The 2-3 shift valve 111 causes engagement and disengagement of the proper clutch and brake (clutch 33 and brake 34) for causing changes between second and third speed drives. The valve 111 comprises pistons 248, 249, and 250. The piston 248 is a simple plug. The piston 250 is provided with lands 251, 252, 253, and 254. The piston 249 has lands 255 and 256. The valve 111 is provided with ports 257, 258, 259, 260, 261, 262, 263, 264, 265, 266, 267, 268, 269, and 270. A spring 271 is disposed between the land 251 and a stationary part to urge piston 250 upwardly as seen in the drawing, and a spring 272 is provided between land 251 and piston 248. The ports 258 and 260 are connected together; ports 261 and 270 are connected to governor pressure conduit 229; the port 268 is a bleed port; ports 262 and 266 are connected by means of a conduit 273 with the piston 65 for rear clutch 33; the port 257 is connected by means of conduit 204 with ports 188 and 186 of the throttle valve 104; port 259 is connected by means of a conduit 274 with port 179 of downshift valve 103; port 265 is connected by means of conduit 244 with port 236 of manual valve 102; and the port 269 is connected by means of conduit 275 with port 178 of downshift valve 103.

The 1-2 shift valve 112, shown in FIGURE 3D, causes engagement and disengagement of the brakes 34 and 35 for causing changes between first and second speed drives. The valve 113 comprises a valve piston 276 provided with lands 277, 278, 279, and 280. Spring 281 is provided between land 280 and a stationary part to urge piston 276 to the down position as seen in the drawing. The 1-2 shift valve has ports 282, 283, 284, 285, 286, 287, and 288. Ports 282, 283, and 286 are bleed ports; port 285 is connected by means of conduit 243 to port 237 of manual valve 102 and apply cavity 76 of the hydraulic motor 71 for brake 34; port 287 is connected by means of conduit 289 to port 240 of manual valve 102; and the port 288 is connected with governor pressure supply conduit 229.

The range control valve 113, shown in FIGURE 3D, is under the control of manual valve 102 and prevents the 2-3 shift valve from moving to its high-speed position when the transmission is operating in the "1" or "2" position of manual valve 102. The valve 113 has a piston 290 comprising lands 291, 292, and 293. The valve 113 comprises ports 294, 295, 296, 297, 298, and 299. Ports 294 and 296 are bleed ports, ports 295 and 298 are connected by means of conduit 243 with port 237 of manual valve 102, port 297 is connected by means of conduit 275 with port 269 of 2-3 shift valve 111 and port 178 of downshift valve 103, and port 299 is connected by means of a conduit 300 to port 235 of manual valve 102.

The transition valve 110, shown in FIGURE 3D, is for the purpose of preventing application of rear servo 35 in the "D" range of operation and comprises a valve piston 301 having lands 302 and 303. The valve 110 has ports 304, 305, 306, 307, and 308. Ports 305 and 308 are bleed ports, port 304 is connected by means of conduit 309 to disapply cavity 77 of hydraulic motor 71 for front brake 34, port 306 is connected by means of a conduit 310 to piston 80 of hydraulic motor 79 for rear brake 35, and port 307 is connected by means of conduit 311 with port 264 of 2-3 shift valve 111. Spring 312 is provided between land 303 and a stationary part to urge valve piston 301 to the up position as seen in the drawing.

The orifice control valve 109, shown in FIGURE 3D, is for the purpose of at times restricting the flow of fluid with respect to the servomotors of various friction engaging devices of the transmission and comprises pistons 313 and 314. The piston 313 is a simple plug and piston 314 comprises lands 315, 316, 317, and 318. A spring 319 is provided at the lower end of piston 314 to hold it in its illustrated position. The valve 109 comprises ports 320, 321, 322, 323, 324, 325, 326, 327, 328, and 329. The port 320 is connected to conduit 310 through a restriction 330, the port 321 is connected to the conduit 204, the port 322 is connected by means of conduit 331 to port 263 of 2-3 shift valve 111, the port 324 is connected through a restriction 332 to conduit 331, port 323 is connected to conduit 309, port 325 is connected to port 326 through restriction 333, port 327 is connected by means of conduit 311 to port 264 of 2-3 shift valve 111 and port 307 of transition valve 110, port 328 is connected by means of conduit 334 to port 284 of 1-2 shift valve 112, and port 329 is connected by means of conduit 245 to port 241 of manual valve 102 and port 267 of 2-3 shift valve 111.

Operation

The main oil pressure regulating valve 107 functions for all conditions of the transmission and its hydraulic control system to regulate the line pressure in the conduit 130 and connected conduits to predetermined maximum values. When the vehicle is standing with the engine running the front pump supplies line pressure to conduits 117 and 130. Check valve 134 is held open by the fluid pressure in conduit 117 and fluid pressure in conduit 130 holds check valve 131 closed so that fluid cannot escape through rear pump 101.

When the vehicle begins to move the rear pump 101 begins its pumping action and when the pressure of fluid discharged overcomes spring 133 and the force of line pressure, check valve 131 opens and line pressure then closes check valve 134. The rear pump 101 now becomes the sole source of line pressure in conduit 130. Front pump 100 now functions solely to supply fluid under pressure through conduit 117, ports 143 and 144 of valve 107, and conduit 160 to converter 31 and for lubrication.

The secondary main regulator valve 108 regulates the fluid pressure within the conduit 160 and thereby within the torque converter 31 to which the conduit 160 supplies fluid pressure. The regulator valve maintains the fluid pressure in the conduit 160 at a predetermined maximum value. The conduit 162 is connected to various working parts of the transmission for lubricating them.

For most conditions of operation, a variable force is applied to the piston 137 of valve 107 and piston 149 of valve 108 which tends to move the valves and change the regulated line pressure. This variable force is due to fluid pressure of different values (termed compensator pressure) which is applied through conduit 226 to the lower ends of pistons 137 and 149.

The compensator pressure in conduit 226 increases with increasing governor pressure and increasing vehicle speed and decreases with increasing throttle pressure and throttle opening. Increased compensator pressure in conduit 226 acts against the springs 142 and 153 of valves 107 and 108 respectively to reduce the line pressure in conduits 130 and 160. Thus, when the pressure in conduit 226 is equal to full line pressure, the regulated pressure in conduits 130 and 160 is maintained at a predetermined minimum. When the compensator pressure in conduit 226 is at a minimum, the valves 107 and 108 regulate the line pressures in conduits 130 and 160 to the predetermined maximum.

Thus, when the accelerator is deeply depressed, line pressure will be regulated to a high value. This high pressure is necessary on the various friction devices and the torque converter so that the transmission will be capable of transmitting the high torque output of the engine just after the throttle is deeply depressed or in its completely open position. However, as the vehicle gains speed, the governor pressure increases and reduces the regulated line pressure. This reduction is desirable since as the vehicle gains speed, the torque required to be transmitted by the transmission is less and the high line pressure is unnecessary.

Governor valve 114 produces an output pressure that varies gradually with changing forces on the valve. Line pressure is supplied to port 168 of the governor valve for all forward ratios through conduit 244. Casing 164 of the governor valve rotates with the driven shaft 26 and as the speed of the driven shaft increases, the weight 172 and piston 175 move outwardly with respect to casing 164. As the weight 172 and piston 175 move outwardly, fluid pressure in port 168 is metered between the lower edge of port 168 and the lower edge of land 166. This fluid pressure which will increase with the increase in speed of the driven shaft flows through port 169 into governor pressure conduit 229.

The accelerator 181 acts on throttle valve piston 182 through the intermediary of downshift valve piston 175 to provide a throttle pressure in the conduit 204 which is less than line pressure in conduit 130 and which increases from zero at closed throttle to line pressure at open throttle. Line pressure is supplied to throttle valve 104 through port 187 and as the throttle is depressed, fluid pressure is metered between the left-hand side of land 184 and the left side of port 187 through port 188 into throttle pressure conduit 204.

The throttle pressure from the throttle valve 104 is supplied to port 201 of the throttle modulator valve 106 through conduit 204. The valve 106 functions to provide a limited or so-called modulator pressure in the conduit 227 which is the same as the throttle pressure in conduit 204 up to a predetermined maximum value and for further increases in throttle pressure remains at the predetermined maximum value. Throttle pressure in port 201 tends to move piston 192 to the left against spring 196 and throttle pressure is admitted to conduit 227 through port 200.

Compensator valve 105 regulates the pressure in compensator pressure conduit 226 and thereby influences the regulated line pressure as previously discussed. Line pressure is admitted to valve 105 through port 220 from conduit 130. Fluid pressure is metered between the left-hand side of land 210 and the left side of port 220 and flows into conduit 226 through port 219. Throttle modulator pressure in port 222 tends to move piston 206 to the left closing port 220 and thereby reducing the pressure in conduit 226. This reduction gives the desired effect of increased line pressure (as previously discussed) when the throttle is depressed. Governor pressure in port 216 acts on piston 205 and through spring 215b tends to move piston 206 to the right opening port 220 and thereby increasing the pressure in conduit 226. This increased compensator pressure gives the desired effect of reducing line pressure as the vehicle speed increases.

The foregoing discussion should be adequate to provide a complete understanding of the operation of the regulator valves, the governor valve, the throttle valve, the throttle modulator valve, and the compensator valve. However, for further details of the operation of these elements of the transmission, reference can be had to Patent No. 2,971,405 issued to G. E. Flinn, dated February 14, 1961.

The following is a discussion of the operation of the controls of this transmission in each range of operation.

Neutral

When the selector lever 246 is moved to the neutral position, the position illustrated in FIGURE 3B, line pressure supplied by conduit 130 through ports 238 and 239 is blocked by lands 232 and 233 of manual valve 102. At this time, no fluid pressure is admitted to any of the servomotors for the friction devices of the transmission and the transmission is in its neutral condition.

"1" Range

When position "1" of the manual valve 102 is obtained by moving selector lever 246, line pressure in conduit 130 is admitted through port 238, between lands 232 and 231, and to ports 236 and 237. Line pressure is also admitted through port 239, between lands 233 and 234, and to port 240.

Fluid pressure is admitted to conduit 244 through port 236 and is carried to the governor valve 114 as the source of fluid pressure for the governor, and is also carried by conduit 244 to piston 59 to apply front clutch 32. Fluid pressure is admitted to conduit 289 through port 240 and is carried to port 287 of the 1-2 shift valve 112. Fluid pressure in port 287 acts on the differential area between lands 279 and 280 to move the 1-2 shift valve to its first speed position, and fluid pressure in port 287 then acts on he differential area between lands 278 and 280 to lock the valve in its first speed position (the "up" position as illustrated in 3D).

Fluid pressure is admitted through port 237 to conduit 243 and is carried by conduit 243 to the release cavity 76 of servomotor 71 for the front brake 34 and is also carried to ports 295 and 298 of the range control valve 113. Fluid pressure in port 295 of range control valve 113 acts on the differential area between lands 291 and 292 to move piston 290 to its "up" position as illustrated in FIGURE 3D.

When piston 290 moves to the "up" position, fluid pressure in port 298 is admitted through port 297 into conduit 275. Fluid pressure is transmitted by conduit 275 to port 269 of the 2-3 shift valve 111 and to port 178 of the downshift valve 103. Fluid pressure in port 269 of 2-3 shift valve 111 acts on the differential area between lands 255 and 256 to lock the 2-3 shift valve in its low speed position (the "up" position as illustrated in FIGURE 3C). Fluid pressure flows from port 178 of downshift valve 103 (assuming the downshift vave is not in its full open throttle position) into port 179 in conduit 274 to port 259 of the 2-3 shift valve 111. The fluid pressure admitted through port 259 acts on land 251 of the 2-3 shift valve to aid in locking the valve in its low speed position.

Fluid pressure in conduit 243 flows through port 285 of 1-2 shift valve 112, between lands 277 and 278, through port 284, and conduit 334 to port 328 of the orifice control valve 109. Fluid pressure flows from port 328 into port 327, through conduit 311, port 264 of the 2-3 shift valve 111, port 263, conduit 331, through ports 322 and 324 of the orifice control valve 109, port 323, and conduit 309 to the release cavity 77 of the servomotor 71 for brake 34. Thus, fluid pressure exists in both the release and apply cavities of servomotor 71, and front brake 34 is held disengaged. Fluid pressure is also carried by conduit 309 to port 304 of transition valve 110. Fluid pressure in port 304 moves piston 301 of valve 110 against spring 312 to its "down" position as illustrated in FIGURE 3D. With piston 301 in its "down" position, the fluid pressure existing in conduit 311 flows through port 307 and conduit 310 to servomotor 79 to apply the band for rear brake 35.

Thus, front clutch 32 and the rear brake 35, which holds planetary carrier 52 stationary, are applied and the transmission is in its first speed or low ratio.

One-way brake 70 holds planetary carrier 52 stationary, but the rear brake 35 is also applied to give a 2-way drive. This is necessary to obtain the desired engine braking effect when operating in the "1" range.

The differential areas between lands 278 and 280 of the 1-2 shift valve and lands 255 and 256 of the 2-3 shift valve have been so designed that the valves are located in their low speed or "up" positions regardless of the value of the governor pressure in conduit 229 which tends to move these valves to their high-speed position. Thus, the transmission will remain in the first speed or low ratio until the selector lever 246 is moved out of the "1" position.

*"2" range*

When the manual valve 102 is placed in the "2" position by selector lever 246, fluid pressure is admitted through port 238, between lands 232 and 231, and into ports 236 and 237. Line pressure supplied to port 239 by conduit 130 is blocked by lands 233 and 232 and fluid pressure previously existing in port 240 and conduit 289 is now exhausted through port 242.

Since there is now no fluid pressure in conduit 289, there is no locking pressure in port 287 of the 1-2 shift valve 112, and piston 276 of 1-2 shift valve moves under the influence of spring 281 and governor pressure supplied through port 288, and acting on land 280, to its second speed position (the "down" position as illustrated in FIGURE 3D). Line pressure still exists in conduit 243 and acts as previously described to hold the 2-3 shift valve in its low speed or "up" position. Fluid pressure in conduit 243 flows to port 285 of 1-2 shift valve 112 and is now blocked by land 278. Therefore, line pressure no longer exists in conduits 334, 331, or 311. Fluid pressure in release cavity 77 of servomotor 71 is now exhausted through conduit 309, port 323 of orifice control valve 109, ports 322 and 332, conduit 331, port 263 of 2-3 shift valve 111, port 264, conduit 311, ports 327 and 328 of orifice control valve 109, conduit 334, port 284 of 1-2 shift valve 112, and bleed port 283. Fluid pressure in servomotor 79 for rear brake 35 is now exhausted through conduit 310, port 306 of transition valve 110, and through bleed port 305. Piston 301 of transition valve 110 is now in its "up" position uncovering bleed port 305 since the fluid pressure in port 304 and conduit 309 has been exhausted as above described.

Since there is no fluid pressure in release cavity 77 of servomotor 71, the pressure in apply cavity 76 applies the band for brake 34 and since the rear band is now released by conduit 310 being exhausted, and clutch 32 remains applied, the transmission is now in its second speed or intermediate ratio with the sun gear 47 being held stationary.

Due to the locking pressure in port 269 of the 2-3 shift valve holding the valve in its low speed position and spring 281 plus governor pressure holding 1-2 shift valve 112 in its high-speed position, the transmission will now remain in the intermediate ratio until the selector lever 246 is moved out of the "2" position. There is no kick down from the intermediate ratio when operating in the "2" range since there is no throttle pressure or other influence provided to move the 1-2 shift valve to its first speed position when operating in the "2" range.

*"D" range*

When the manual valve 102 is placed in its "D" position by selector lever 246, line pressure is admitted to the same conduit as when the manual valve 102 was in the "2" position with the exception that line pressure is now admitted through port 235 into conduit 300. Fluid pressure in conduit 300 is transmitted to port 299 of the range control valve 113 and moves the piston 290 to the "down" position as illustrated in FIGURE 3D. Land 293 now blocks port 298 and, therefore, no fluid pressure is admitted to conduit 275. Conduit 275 is now exhausted through bleed port 296 of range control valve 113, and the locking pressure at port 269 of the 2-3 shift valve 111 is now removed. The 1-2 shift valve 112 remains in its second speed position as described above.

Since the locking pressures have been removed from the 2-3 shift valve, the 2-3 shift valve now acts in the normal manner providing automatic shifting between the intermediate and high-speed drive ratios. When the selector lever is first moved to the "D" position and assuming that the throttle is partially open, and the governor pressure is not significantly high since the vehicle is either standing still or is traveling slowly, the transmission will be conditioned for the intermediate ratio. Since the throttle is partly open, throttle pressure in conduit 204 will be applied to piston 248 and will tend to move the 2-3 shift valve to maintain it in its low-speed or "up" position by acting through spring 272 on land 251. Governor pressure acting through port 261 on the upper side of land 251 and through port 270 on the top of land 256 will tend to move the shift valve to its high-speed or "down" position. Two other forces act on the 2-3 shift valve in opposition to governor pressure and in aiding throttle pressure in port 257 to keep the shift valve in its low-speed position. One of these forces is provided by spring 271 acting on land 251. The other force which is termed "shift valve plug pressure" acts on the lower side of land 251 urging the 2-3 shift valve to its low-speed position.

The "shift valve plug pressure" is less than throttle pressure and is obtained by throttle pressure moving piston 248 up far enough to partially uncover port 258. Spring 272 opposes forward movement of piston 248 and will regulate the "shift valve plug pressure" to a lower value than the throttle pressure. The "shift valve plug pressure" flows through partially uncovered port 258 and through port 260 to act on the lower side of land 251.

Assuming the governor pressure is low due to low forward speed of the vehicle, the combination of the three forces above described will maintain the transmission in the intermediate ratio. Front clutch 32 and brake band 34 are applied by means of the same fluid circuits as described above for the "2" range of operation.

When the vehicle reaches the proper speed, the governor pressure in conduit 229 will act on lands 256 and 251 to move the 2–3 shift valve to its high-speed or "down" position. When the pistons 249 and 250 move to the high-speed position, fluid pressure existing in conduit 244 flows through port 265 into port 266 of the 2–3 shift valve. Fluid pressure now flows through port 266 into conduit 273 and is transmitted to piston 65 to apply rear clutch 33. Fluid pressure in conduit 273 also flows through port 262, between lands 252 and 253 of the 2–3 shift valve, through port 263, conduit 331, ports 322 and 324 of orifice control valve 109, port 323, and conduit 309 to release cavity 77 of servomotor 71 to release brake band 34. With front clutch 32 and rear clutch 33 applied and brake bands 34 and 35 now released, the planetary gear set 36 is now locked up and the transmission is now in the high-speed or 1:1 ratio.

When the vehicle is coasting to a stop in the high-speed ratio, the governor pressure will drop to some value at which the spring 271 can move the pistons 249 and 250 of the 2–3 shift valve to the low-speed or "up" position. When the 2–3 shift valve is moved to the low-speed position, fluid pressure flowing through ports 265 and 266 into conduit 273 to apply the rear clutch is now blocked by land 253 of piston 250. Fluid pressure in conduit 273 is now exhausted and flows through ports 266 and 267 of the 2–3 shift valve, conduit 245, port 241 of the manual valve 102 and out bleed port 242. Fluid pressure in conduit 309 holding the front brake band 34 released is now exhausted and flows through port 323 and into port 324 of orifice control valve 109, through conduit 331, ports 263 and 264 of the 2–3 shift valve, conduit 311, ports 327 and 328 of orifice control valve 109, conduit 334, port 284 of 1–2 shift valve 112, and out bleed port 283. Since the throttle is released at this time, there will be no throttle pressure in conduit 204 acting on the upper side of land 315 of orifice control valve 109, and piston 314 will be moved to its "up" position by spring 319. Since the piston 314 is in its "up" position, land 316 prevents the fluid pressure in conduit 309 from exhausting through both ports 322 and 324 of the orifice control valve 109. Fluid pressure is therefore exhausted only through port 324 and must flow through the restriction 332. The restriction 332 acts to create a delayed release of the pressure in conduit 309 and provides an overlap in application of brake band 34 and release of rear clutch 33. This provides a smooth downshift from high speed to the intermediate ratio when coasting to a stop. Since the front clutch 32 and rear brake 34 are now engaged and rear clutch 33 has been released as described, the transmission is in the intermediate ratio.

When operating in the "D" range with the transmission in its high-speed ratio, a kickdown to intermediate ratio is available for passing and for rapid acceleration of the vehicle when desired. When the throttle is moved to the full open position for kickdown, piston 175 of downshift valve 103 is moved to its extreme right position and uncovers port 180. Line pressure in conduit 130 now flows through port 180, between lands 176 and 177 of piston 175, through port 179, conduit 274, and to port 259 of the 2–3 shift valve 111. The combination of line pressure in port 259 acting on the lower side of land 251 of 2–3 shift valve 111 and springs 271 and 272 now serves to move the 2–3 shift valve to its low-speed or "up" position provided that the vehicle speed and therefore the governor pressure is not above some predetermined value. With the 2–3 shift valve now in its low speed or "up" position, the transmission will be placed in its intermediate ratio with the same fluid circuits and friction devices used as described above. The heavy throttle pressure in conduit 204 which is now equal to line pressure, moves piston 314 of the orifice control valve 109 to its "down" position against the action of spring 319. With the piston 314 in this position, both ports 322 and 324 are available to exhaust conduit 309 and restriction 332 may now be bypassed. Therefore, in the forced downshift from high speed to intermediate ratio, there will be no overlap between application of brake 34 and release of rear clutch 33 as is desired in kickdown operation for quick response to the depression of the throttle pedal 181.

*Manual downshifts*

The transmission may be manually downshifted from operation in the high-speed ratio with the selector lever in the "D" position by moving the selector lever to the "2" position and may also be downshifted from operation in the intermediate ratio with the selector lever in the "2" position to the first speed ratio by moving the selector lever to the "1" position. These manual downshifts are inhibited to prevent the transmission from shifting to a lower ratio when the vehicle speed is too high to prevent engine overspeeding. The downshifts are inhibited as follows.

When operating with the selector lever in the "D" position and with the transmission in the high-speed ratio, the 2–3 shift valve will be in its "down" position. When the selector lever is now moved to its "2" position to make a manual downshift to the intermediate ratio, conduit 300 is exhausted, and piston 290 of range control valve 113 moves to its "up" position and fluid pressure is now transmitted to conduit 275 in the manner previously described. Fluid pressure now exists in ports 269 and 259 of the 2–3 shift valve. Fluid pressure in port 259 now acts on the lower side of land 251 of the 2–3 shift valve tending to move pistons 250 and 249 up to place the valve in its low-speed position. At this time, fluid pressure in port 269 of the 2–3 shift valve 111 is blocked by land 256. Although the transmission is now conditioned for operation in the intermediate ratio, the force of springs 271 and 272 and fluid pressure in port 259 will not be sufficient to overcome the governor pressure acting on the right-hand side of lands 251 and 256 until the vehicle speed relative to engine speed is at the proper value for the downshift. Once the 2–3 shift valve 111 moves to its low-speed or "up" position, port 269 is uncovered and the valve is locked in its low-speed position in the manner previously described until the selector lever is moved out of the "2" position.

When the transmission is operating in the intermediate ratio with the selector lever in the "2" position and the selector lever is moved to the "1" position, fluid pressure will now be admitted to conduit 289 from manual valve 102 and will act on the 1–2 shift valve tending to move it to its low-speed or "up" position against the force of governor pressure and spring 281. However, at this time fluid pressure in conduit 289 and port 287 of 1–2 shift valve 112 can only act on the small differential area between lands 279 and 280. Therefore, the governor pressure and the spring force on the right-hand side of land 280 will be sufficient to prevent the 1–2 shift valve from moving to its low-speed position until the governor pressure and vehicle speed relative to engine speed is decreased to the proper value for a downshift to first speed. In the same manner as the 3–2 manual downshift described above, once the 1–2 shift valve is moved to its low-speed position, fluid pressure in port 287 will now act on the large differential area between lands 278 and 280 to lock the 1–2 shift valve in its low-speed position until the selector lever is moved from the "1" position.

*Reverse*

When the selector lever moves the manual valve to the "R" or reverse position, line pressure is admitted to ports 237, 240, and 241 of the manual valve 102. Line pressure flows through port 240 into conduit 289 to port 287 to lock the 1–2 shift valve in its low-speed position. Line pressure flows from port 237 of manual valve 102 into conduit 243 to the apply cavity 76 of servomotor 71 for front brake 34, to ports 298 and 295 of range control valve 113, and to port 285 of the 1–2 shift valve 112. Fluid pressure in port 298 of range control valve 113 is transmitted through valve 113 to port 269 of the 2–3 shift valve to lock the 2–3 shift valve in its low-speed position in the manner previously described. Fluid pressure flows from port 285 of 1–2 shift valve 112 through port 284 into conduit 334, through ports 328 and 327 of orifice control valve 109, conduit 311, ports 264 and 263 of 2–3 shift valve 111, conduit 331, ports 324 and 323 of the orifice control valve 109, and conduit 309 to release cavity 77 of front brake 34. Since fluid pressure exists in both the release and apply cavities of the servomotor 71 for brake 34, brake 34 is held disengaged.

Since fluid pressure now exists in port 304 of transition valve 110, piston 301 will be in its "down" position and fluid pressure in conduit 311 will be admitted to conduit 310 to apply rear brake 35. Line pressure is also admitted to conduit 245 from port 241 of manual valve 102 and is transmitted by conduit 245 to port 198 of throttle modulator valve 106, port 329 of orifice control valve 109, and port 267 of 2–3 shift valve 111. Line pressure flows from port 267 of the 2–3 shift valve through port 266 and into conduit 273 to apply rear clutch 33. Front clutch 32 is not applied since no fluid pressure is admitted to conduit 244 from the manual valve 102. With only the rear clutch 33 and rear brake 35 applied, the transmission is now in its reverse drive ratio.

Line pressure in port 198 of throttle modulator valve 106 acts to move the piston 192 to the right as seen in FIGURE 3B and thereby insures that port 201 is not blocked by land 194. Therefore, fluid pressure in conduit 227 which acts on land 211 of the compensator valve 105 will be at a high value. There is no governor pressure in conduit 229 at this time since the supply conduit 244 for the governor has no fluid pressure in it. Therefore, throttle modulator pressure in conduit 227 is unopposed in moving piston 206 of the compensator valve 105 to the left which results in the compensator pressure in conduit 226 being at a minimum. With the compensator pressure at a minimum, the regulator valve 107 functions to regulate line pressure in conduit 130 to its maximum value.

The maximum value of line pressure is desired at this time so that the rear clutch 33 and rear brake 35 will be engaged with sufficient force for the transmission to transmit the heavy torque loads existing when operating in the reverse ratio.

From the above description, it will be clear that the transmission described has important advantages over known automatic transmissions since it may be used both as an automatic transmission and as a transmission wherein the operator has manual control for selecting the desired ratio.

For maximum performance when used in connection with a high-performance engine, the transmission can be kept in its first or intermediate ratios until the optimum engine r.p.m. is obtained by using the "1" and "2" positions of the selector lever. The "1" and "2" positions are also useful to manually downshift the transmission to provide increased engine braking as a means of decelerating. It should be noted in this connection that all forward ratios of this transmission are 2-way drives and provide a desired engine braking sometimes termed "down-hill" braking. It should also be noted that when the low or intermediate ratio is selected by placing the selector lever in the "1" or "2" position, the transmission remains in the selected ratio until the selector lever is moved from the selected position, and no automatic shifting will occur.

We wish it to be understood that the invention is not to be limited to the specific constructions and arrangements shown and described, except only insofar as the claims may be so limited, as it will be understood to those skilled in the art that changes may be made without departing from the principles of the invention.

We claim:

1. A control system for an automatic transmission providing a plurality of drive ratios comprising a first means shiftable to a plurality of positions, a source of fluid pressure a second means operatively connected to said first means and said source and movable between two positions, a third means operatively connected to said first means and said source and movable between two positions, said second and third means operatively connected to said transmission to establish different drive ratios for said transmission, said first means having a first position wherein said second and third means are hydraulically locked in one of said two positions to establish a first drive ratio, said first means having a second position wherein said second means is moved to the other of said two positions and said third means is hydraulically locked in said one position to establish a second drive ratio, said first means having a third position wherein said second means remains in said other position and said third means is released enabling said third means to move between either of said two positions to establish a drive ratio associated with each of said two positions.

2. A control system for an automatic transmission providing a plurality of drive ratios comprising a first valve means having a plurality of positions, a source of fluid pressure, a second valve means operatively connected to said first valve means and said source and movable between two positions, a third valve means operatively connected to said first valve means and movable between two positions, said second and third valve means operatively connected to said transmission to establish different drive ratios for said transmission, said first valve means having a first position wherein said second and third valve means are hydraulically locked in one of said two positions and a low speed drive ratio is established in said transmission, said first valve means having a second position wherein said third valve means is hydraulically locked in said one position and said second valve means moves to the other of said two positions and an intermediate speed drive ratio is established in said transmission, said first valve means having a third position wherein said second valve means remains in said other position and said third valve means is released to enable said third valve means to move between said two positions whereby either said intermediate speed drive ratio or a high speed drive ratio will be rendered effective.

3. In an automatic transmission, a drive shaft, a driven shaft, engageable means providing low and intermediate and high speed drive trains between said shafts, hydraulic control means for said transmission, a source of fluid pressure for said control means, said hydraulic control means including a manual valve having a plurality of positions, first and second shift valves operatively connected to said manual valve and said engageable means, each of said shift valves having a low speed and a high speed position, means urging said first shift valve to its high speed position, hydraulic locking means comprising a differential land area for each of said shift valves, said manual valve having a first position wherein said locking means are actuated to lock each of said shift valves in their said low speed positions wherein said engageable means is actuated to establish said low speed drive train, said manual valve having a second position wherein said locking means is actuated to lock said second shift valve in said low speed position and said urging means moves said first shift valve to said high speed position whereby said engageable means is actuated to establish said intermediate speed drive train, said manual valve having a third position wherein said urging means holds said first shift valve in said high speed position and said second shift valve is released to permit said second shift valve to move between said low and high speed positions whereby either said intermediate drive train or said high speed drive train will be rendered effective.

4. In an automatic transmission, a drive shaft, a driven shaft, a planetary gear set interconnecting said drive and driven shafts, a plurality of hydraulically actuated friction devices for said planetary gear set engageable to complete a drive train between said shafts, said planetary gear set providing low and intermediate and high speed drive ratios when certain of said friction devices are engaged, a source of fluid pressure, hydraulic control means for said automatic transmission, said control means including a manual valve for selecting a range of operation for said transmission, said source of fluid pressure being connected to said manual valve, a first shift valve for controlling ratio changes between said low and intermediate speed drive ratios, a second shift valve for controlling ratio changes between said intermediate and high speed drive ratios, said first and second shift valves being hydraulically connected to certain of said friction devices, each of said first and second shift valves having a low speed and a high speed position, means responsive to vehicle speed acting on said first and second shift valves with increasing force as said vehicle speed increases to urge said first and second shift valve to their said high speed positions, additional urging means acting on said first shift valve to urge said first shift valve to its high speed position, an accelerator pedal adapted to be connected to the throttle control of an automotive engine, means responsive to depression of said accelerator pedal and connected to said accelerator pedal acting on said second shift valve with increasing force as said accelerator pedal is depressed to urge said second shift valve to its said low speed position; said manual valve being hydraulically connected with both said first and second shift valves, each of said first and second shift valves having two lands of differential area, said manual valve having a first position wherein fluid is applied to said lands of differential area of said first and second shift valves to lock said first and second shift valves in their said low speed positions in which position said first shift valve directs fluid pressure to certain of said friction devices to engage said friction devices and establish said low speed drive ratio, said manual valve having a second position wherein fluid pressure is applied to said lands of differential area of said second shift valve only and said first shift valve moves to its high speed position under the influence of said additional urging means and directs fluid pressure to certain of said friction devices to establish said intermediate speed ratio, said manual valve having a third position wherein no fluid pressure is imposed on said lands of differential area of said first and second shift valves and said second shift valve is free to move under the influence of said vehicle speed responsive means and said means responsive to depression of said accelerator pedal, said second shift valve establishing said high speed drive ratio by directing fluid pressure to certain of said friction devices when moved to its high speed position, said second shift valve providing automatic shifting between said intermediate and high speed drive ratios when said manual valve is in said third position.

5. In an automatic transmission a drive shaft, a driven shaft, engageable means providing low, intermediate and high speed drive trains between said shafts, hydraulic control means for the transmission, a source of fluid pressure connected to said control means, said hydraulic control means including a manual means having a plurality of positions, first and second shift valves operatively connected to said manual means each having a low speed and a high speed position, means urging said first shift valve to its high speed position, hydraulic locking means comprising differential lands for said first shift valve, said manual means having a first position wherein said hydraulic locking means is actuated to lock said first shift valve in its said low speed position wherein said engageable means is actuated to establish said low speed drive train, said manual means having a second position wherein said hydraulic locking means for said first shift valve is released and said urging means moves said first shift valve to its said high speed position whereby said engageable means is actuated to establish said intermediate speed drive train, said manual valve having a third position wherein automatic shifting between ratios is established and said second shift valve is movable between said low and said high speed positions and is enabled to establish either said intermediate speed drive train or said high speed drive train.

6. In an automatic transmission a drive shaft, a driven shaft, engageable means providing low, intermediate and high speed drive trains between said shafts, hydraulic control means for said transmission, a source of fluid pressure for said control means, said hydraulic control means including a manual valve having a plurality of positions, first and second shift valves operatively connected to said manual valve each having a low speed and a high speed position, means operable to move said shift valves to their high speed position, hydraulic locking means comprising a differential land area on said first shift valve, said manual valve having a first position wherein said hydraulic locking means is actuated to lock said first shift valve in its said first speed position wherein said engageable means is actuated to establish said low speed drive train, said manual valve having a second position wherein said hydraulic locking means for said first shift valve is released and said operable means moves said first shift valve to its said high speed position whereby said engageable means is actuated to establish said intermediate speed drive train, said manual valve having a third ratio wherein automatic shifting between ratios is established and said second shift valve is movable between said low and said high speed positions and is enabled to establish either said intermediate speed drive train or said high speed drive train.

References Cited in the file of this patent
UNITED STATES PATENTS

| | | |
|---|---|---|
| 2,895,344 | Holdeman et al. | July 21, 1959 |
| 2,950,629 | Holdeman et al. | Aug. 30, 1960 |